(12) United States Patent
Long, Sr. et al.

(10) Patent No.: US 12,207,753 B2
(45) Date of Patent: *Jan. 28, 2025

(54) BEVERAGE BREWING ASSEMBLY

(71) Applicant: NORTHWIND HOLDINGS, LLC, West Dundee, IL (US)

(72) Inventors: Robert J. Long, Sr., Lake in the Hills, IL (US); Bryan Real, West Dundee, IL (US)

(73) Assignee: NORTHWIND HOLDINGS, LLC, West Dundee, IL (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/968,306

(22) Filed: Oct. 18, 2022

(65) Prior Publication Data
US 2023/0041554 A1 Feb. 9, 2023

Related U.S. Application Data

(63) Continuation of application No. 16/721,046, filed on Dec. 19, 2019, now Pat. No. 11,503,944.

(51) Int. Cl.
A47J 31/40 (2006.01)
A47J 31/06 (2006.01)
A47J 31/46 (2006.01)

(52) U.S. Cl.
CPC ......... A47J 31/401 (2013.01); A47J 31/0615 (2013.01); A47J 31/404 (2013.01); A47J 31/46 (2013.01)

(58) Field of Classification Search
CPC .. A47J 31/00; A47J 31/0615; A47J 31/10–12; A47J 31/40; A47J 31/401; A47J 31/404
See application file for complete search history.

(56) References Cited

U.S. PATENT DOCUMENTS

| | | | | |
|---|---|---|---|---|
| 3,385,569 A | * | 5/1968 | Bookout | A47J 31/401 366/177.1 |
| 4,015,749 A | * | 4/1977 | Arzberger | A47J 31/401 222/640 |
| 4,718,579 A | | 1/1988 | Brody et al. | |
| 4,919,041 A | | 4/1990 | Miller | |
| 5,241,898 A | | 9/1993 | Newnan | |
| 5,542,342 A | * | 8/1996 | McNeill | A47J 42/40 99/289 R |
| 5,733,591 A | | 3/1998 | Goerndt | |

(Continued)

Primary Examiner — John J Norton
(74) Attorney, Agent, or Firm — PRICE HENEVELD LLP

(57) ABSTRACT

A beverage brewing assembly includes a mixing chamber configured to receive a first beverage material and defining an aperture configured to be selectively opened. A hot water source is operably coupled with the mixing chamber and is configured to selectively provide a predetermined quantity of hot water to the mixing chamber and thereby form a mixture comprising the first beverage material and the predetermined quantity of hot water. A brew basket is positioned below the mixing chamber and includes an outlet at a bottom of the brew basket. The brew basket is configured to house a second brewing material and is configured to receive the mixture from the aperture of the mixing chamber to interact with the second brewing material. A receptacle is positioned below the brew basket and is configured to receive a brewed beverage from the outlet of the brew basket.

24 Claims, 12 Drawing Sheets

(56) References Cited

U.S. PATENT DOCUMENTS

| | | | |
|---|---|---|---|
| 5,931,343 A | 8/1999 | Topar et al. | |
| 5,975,357 A | 11/1999 | Topar | |
| 6,149,035 A | 11/2000 | Gorski et al. | |
| 9,468,222 B2 | 10/2016 | Stewart et al. | |
| 9,468,330 B2 | 10/2016 | Stewart et al. | |
| 9,549,634 B2 | 1/2017 | Stewart et al. | |
| 9,668,496 B1 | 6/2017 | Lassota | |
| 9,725,232 B2 | 8/2017 | Stewart et al. | |
| 10,071,852 B2 | 9/2018 | Stewart et al. | |
| 10,093,480 B2 | 10/2018 | Stewart et al. | |
| 10,130,209 B2 | 11/2018 | Stewart et al. | |
| 11,503,944 B2 * | 11/2022 | Long, Sr. | A47J 31/404 |
| 2011/0008504 A1 | 1/2011 | Wells | |
| 2012/0285329 A1 * | 11/2012 | Verhoeven | A47J 31/46 99/275 |
| 2015/0150410 A1 | 6/2015 | Ratterman et al. | |
| 2017/0000288 A1 * | 1/2017 | Dubief | A47J 31/404 |
| 2017/0013995 A1 | 1/2017 | Huberts | |
| 2017/0347828 A1 * | 12/2017 | Shtivelman | A47J 31/401 |
| 2019/0053659 A1 | 2/2019 | Stewart et al. | |

\* cited by examiner

BEVERAGE BREWING ASSEMBLY

CROSS REFERENCE TO RELATED APPLICATION

The present application is a continuation of and claims priority under 35 U.S.C. § 120 to commonly assigned U.S. Pat. No. 11,503,944, issued Nov. 22, 2022, entitled BEVERAGE BREWING ASSEMBLY, which is incorporated in its entirety herein by reference.

FIELD OF THE DISCLOSURE

The present disclosure generally relates to a beverage brewing assembly, and more specifically to a beverage brewing assembly including a separate mixing chamber and brew basket.

BACKGROUND OF THE DISCLOSURE

Beverage brewing assemblies utilized to make sweetened or flavored brewed beverages often brew the beverage and deposit the beverage into a receptacle. A sweetener is then added to the receptacle at a lower temperature than when the beverage is brewed. The sweetener does not mix fully because of the lowered temperature and leaves a residue at the bottom of the container, causing inconsistent sweetening and/or flavor of the beverage.

SUMMARY OF THE DISCLOSURE

According to one aspect of the present disclosure, a beverage brewing assembly includes a product canister configured to house a first beverage material. A connector is operably coupled with the product canister and has an open end. An auger is positioned within the connector and is configured to transport the first beverage material through the connector. A mixing chamber is positioned below the open end of the connector and is configured to receive the first beverage material from the open end of the connector. The mixing chamber comprises an aperture at a bottom of the mixing chamber. A hot water source is operably coupled with the mixing chamber and is configured to selectively provide a predetermined quantity of hot water to the mixing chamber to form a mixture that then passes through the aperture. A brew basket is positioned below the mixing chamber and is configured to house a second brewing material and receive the mixture. The brew basket comprises an outlet at a bottom of the brew basket through which passes the mixture. A receptacle is positioned below the brew basket and is configured to receive a brewed beverage formed from the mixture and the second brewing material from the outlet of the brew basket.

According to another aspect of the present disclosure, a beverage brewing assembly includes a mixing chamber configured to receive a first beverage material and defining an aperture configured to be selectively opened. A hot water source is operably coupled with the mixing chamber and is configured to selectively provide a predetermined quantity of hot water to the mixing chamber and thereby form a mixture comprising the first beverage material and the predetermined quantity of hot water. A brew basket is positioned below the mixing chamber and includes an outlet at a bottom of the brew basket. The brew basket is configured to house a second brewing material and is configured to receive the mixture from the aperture of the mixing chamber to interact with the second brewing material. A receptacle is positioned below the brew basket and is configured to receive a brewed beverage from the outlet of the brew basket.

According to another aspect of the present disclosure, a method of brewing a beverage includes a step of placing a first beverage material within a product canister operably coupled with a connector. The method further includes a step of transporting the first beverage material through the connector into a mixing chamber. Another step includes adding a predetermined quantity of hot water from a hot water source into the mixing chamber to create a mixture within the mixing chamber. Yet another step of the method includes placing a second beverage material within a brew basket. The method further includes a step of opening an aperture of the mixing chamber to allow the mixture to flow into the brew basket with the second beverage material to create a brewed beverage.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
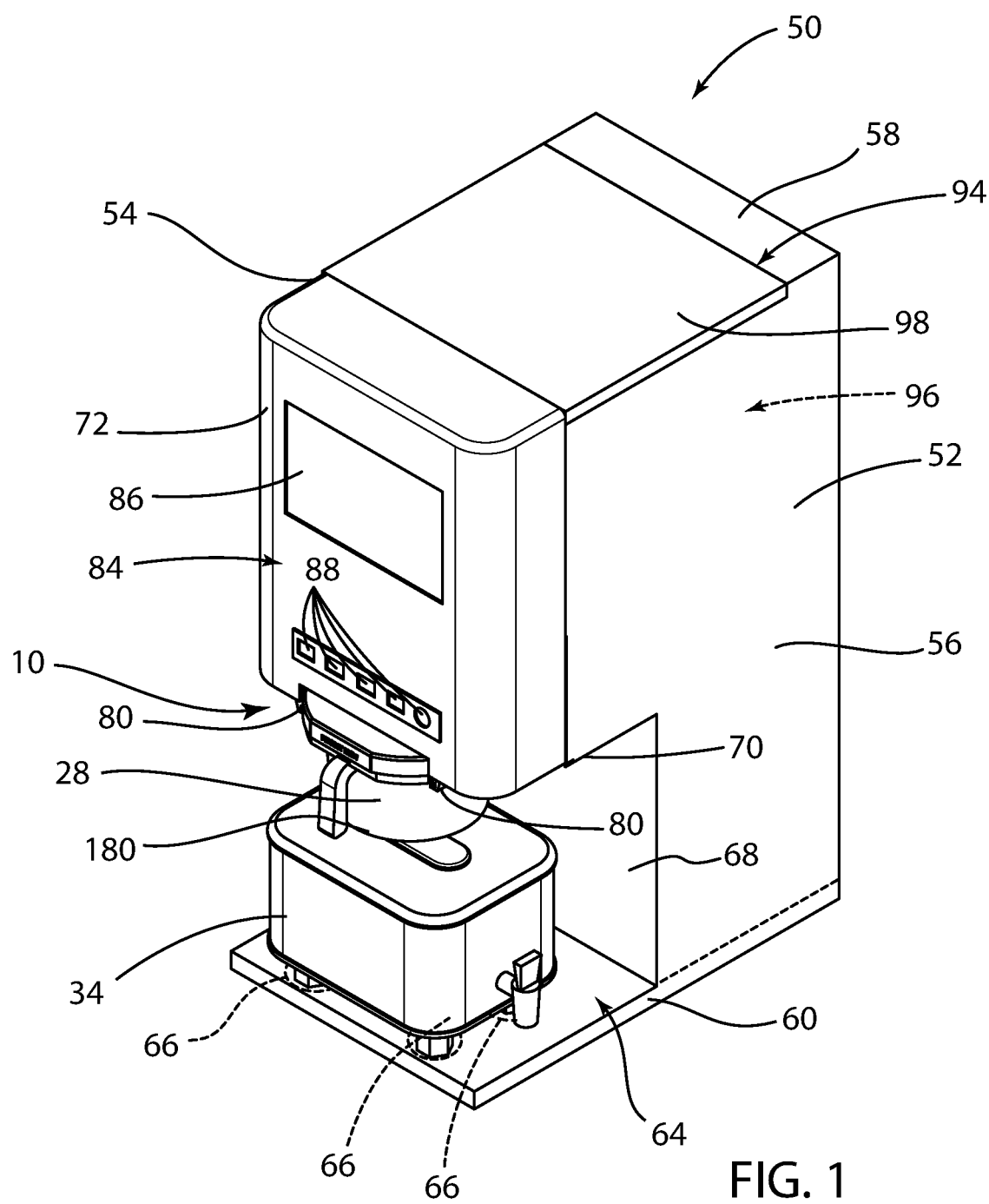
FIG. 1 is a side perspective view of a beverage appliance, according to various examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-7, reference numeral 10 generally designates a beverage brewing assembly that includes at least one product canister 12. The product canister 12 is configured to house a first beverage brewing material 14. A connector 16 is operably coupled with the product canister 12 and has an open end 18. An auger 20 is positioned within the connector 16 and is configured to transport the first beverage material 14 through the connector 16. A mixing chamber 22 is positioned below the open end 18 of the connector 16 and is configured to receive the first beverage material 14 from the open end 18 of the connector 16. The mixing chamber 22 includes an aperture 24 at a bottom of the mixing chamber 22. A hot water source 26 is operably coupled with the mixing chamber 22 and is configured to selectively provide a predetermined quantity of hot water to the mixing chamber 22 to form a mixture that then passes through the aperture 24. A brew basket 28 is positioned below the mixing chamber 22 and is configured to house a second beverage material 30 and receive the mixture. The brew basket 28 includes an outlet 32 at a bottom of the brew basket 28 through which passes the mixture. A receptacle 34 is positioned below the brew basket 28 and is configured to receive a brewed beverage formed from the mixture and the second brewing material 30 from the outlet 32 of the brew basket 28.

Figure 2:
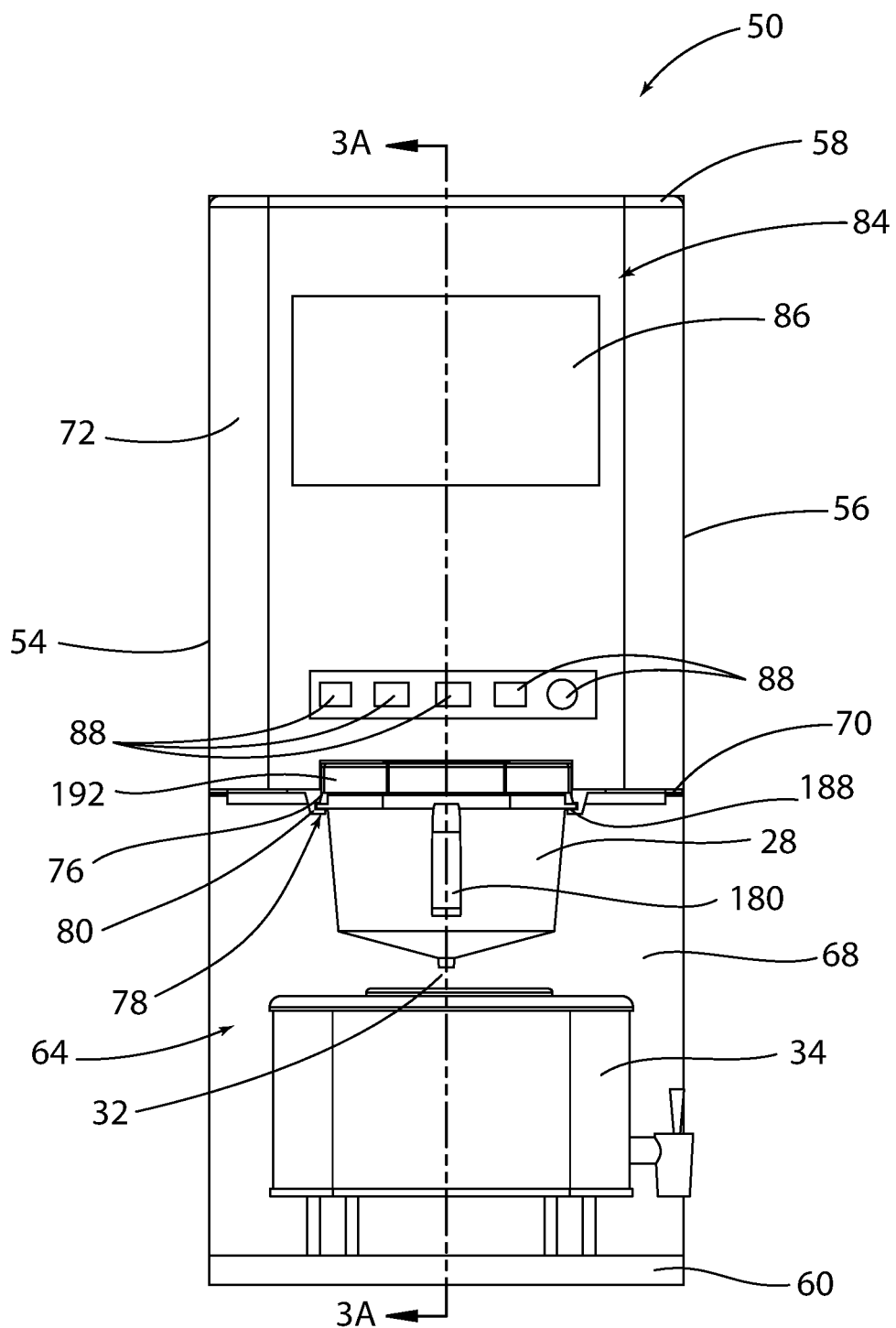
FIG. 2 is a front elevational view of the beverage appliance of FIG. 1.

Referring now to FIGS. 1 and 2, a beverage appliance 50 that includes the beverage brewing assembly 10 is illustrated. The beverage appliance 50 includes an appliance body 52 having first and second sidewalls 54, 56 joined by a top wall 58 and extending upward from a base 60. The first and second sidewalls 54, 56 are shaped to at least partially define a receiving space 64 configured to receive the receptacle 34. A front portion of the base 60 is configured to support the receptacle 34. For example, the base 60 may include guides 66, such as, for example, recesses or indicia, for indicating the position of the receptacle 34 within the receiving space 64 for use with the beverage appliance 50. It is contemplated that any combination of guides 66 may be used to accommodate various types of receptacles 34 within the receiving space 64.

A lower front wall 68 extends between lower portions of the first and second sidewalls 54, 56 and is positioned rearward of the receiving space 64. As illustrated, the lower front wall 68 may be substantially linear so that the receiving space 64 is substantially rectilinear. In other examples, the lower front wall 68 may be generally arcuate so that the receiving space 64 includes a curvilinear portion. In still other examples, the lower front wall 68 may be any other combination of linear and/or non-linear portions. The shape of the receiving space 64 is determined by the shape of the receptacle 34 configured to be positioned within the receiving space 64. For example, where the receptacle 34 has a curved edge, the lower front wall 68 may be arcuate to complement the curved edge.

An intermediate wall 70 extends forward from the lower front wall 68 and parallel to the base 60. The intermediate wall 70 couples the lower front wall 68 with an upper front wall 72 and is positioned between the base 60 and the top wall 58 of the appliance body 52. The intermediate wall 70 defines a lower opening 76 of the appliance body 52. The lower opening 76 is configured to align with the brew basket 28, as discussed in more detail elsewhere herein. In various examples, the intermediate wall 70 may further define a plurality of slots 78 positioned proximate the lower opening 76 and configured to retain the brew basket 28 substantially flush with the intermediate wall 70. In other examples, a plurality of rails 80 may extend from the intermediate wall 70 toward the base 60 and may be configured to define the plurality of slots 78.

The upper front wall 72 is coupled with the intermediate wall 70, the first and second sidewalls 54, 56, and the top wall 58. The upper front wall 72 is configured to extend perpendicular to the intermediate wall 70 and may include a user interface 84 having a display 86 and/or inputs 88 to be actuated by a user. The upper front wall 72 may be positioned forward of the lower front wall 68. In various examples, the upper front wall 72 may be substantially aligned with a front edge of the base 60 and extends over the receptacle 34 when the receptacle 34 is positioned within the receiving space 64.

The top wall 58 of the appliance body 52 defines an upper opening 94 of the appliance body 52. The upper opening 94 is configured to provide access to an interior cavity 96 defined by the appliance body 52. A cover 98 is operably coupled with the top wall 58 and configured to selectively cover the upper opening 94. In various examples, the cover 98 may be hingedly coupled with top wall 58 proximate the upper opening 94. In other examples, the cover 98 may be removable. When the cover 98 is open, a user may access the interior cavity 96 through the upper opening 94 in order to add or remove the product canister 12 and/or the first beverage material 14. In other examples, the upper front wall 72 may also be removable to allow the user to access the interior cavity 96 to add or remove the product canister 12 and/or the first beverage material 14.

Figure 3A:
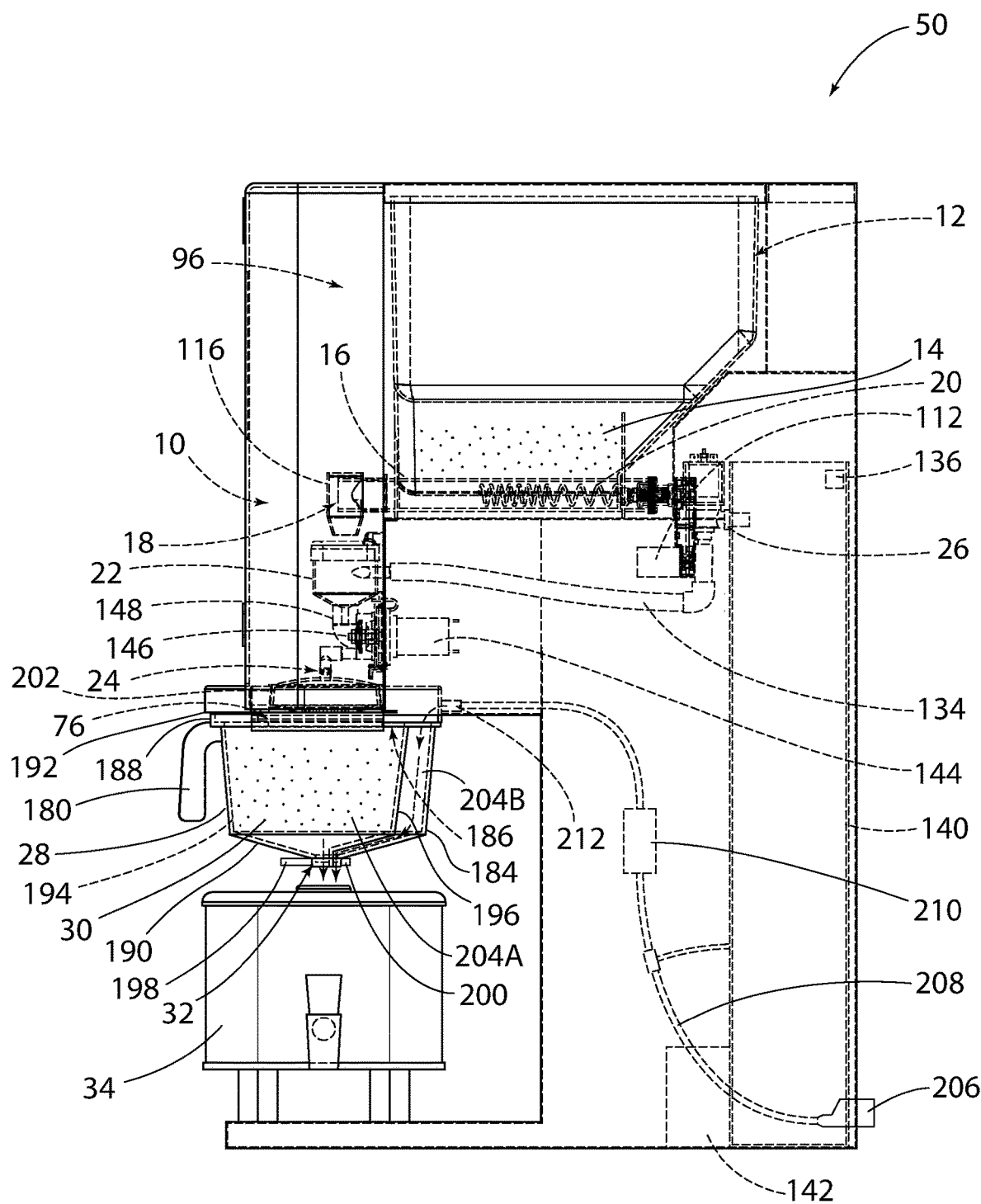
FIG. 3A is a cross-sectional view of a beverage appliance illustrating a beverage brewing assembly, according to various examples.
Figure 3B:
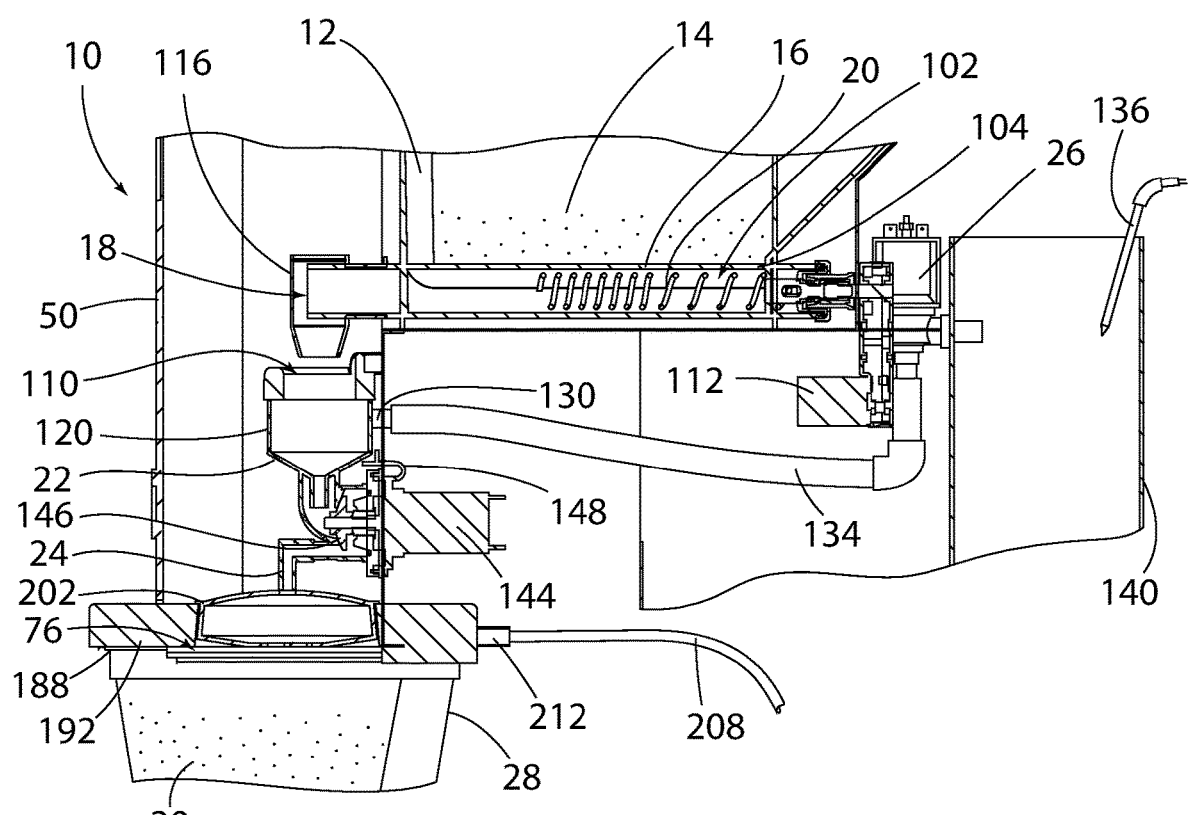
FIG. 3B is an enlarged view of the beverage brewing assembly of FIG. 3A.
Figure 3C:
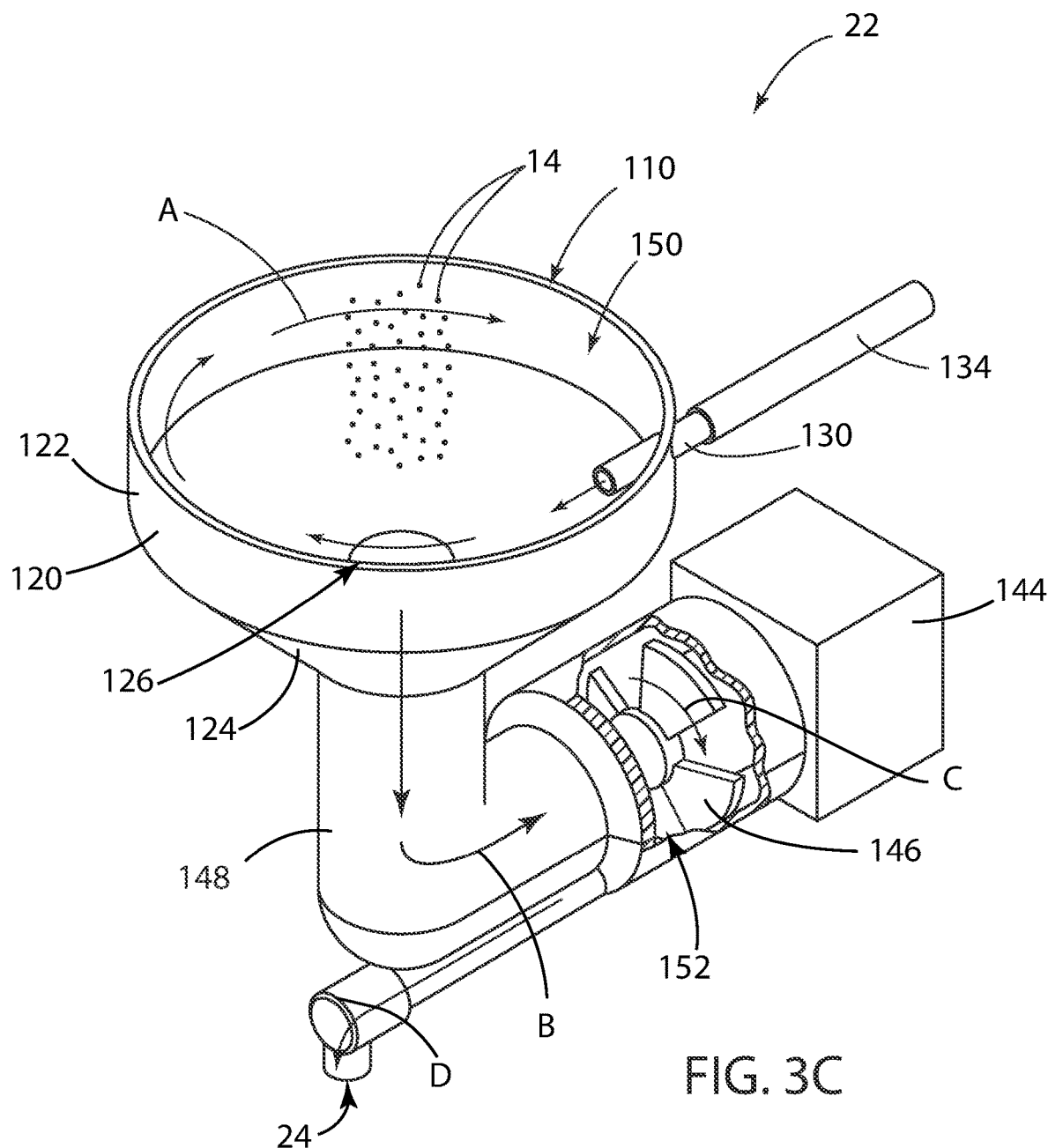
FIG. 3C is an enlarged side perspective view of a mixing chamber of the beverage brewing assembly of FIG. 3A.
Figure 4A:
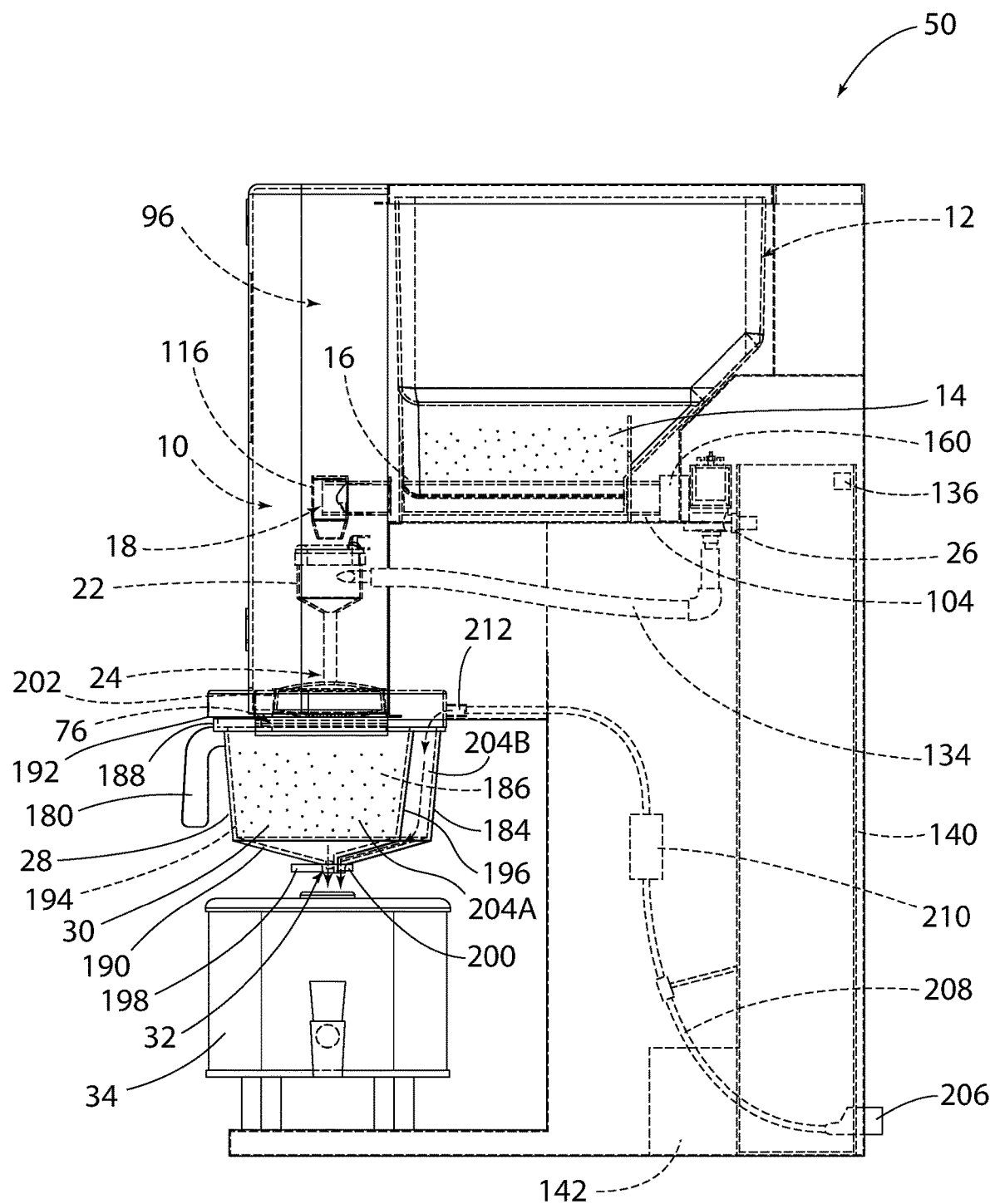
FIG. 4A is a cross-sectional view of a beverage appliance illustrating a beverage brewing assembly, according to various examples.
Figure 4B:
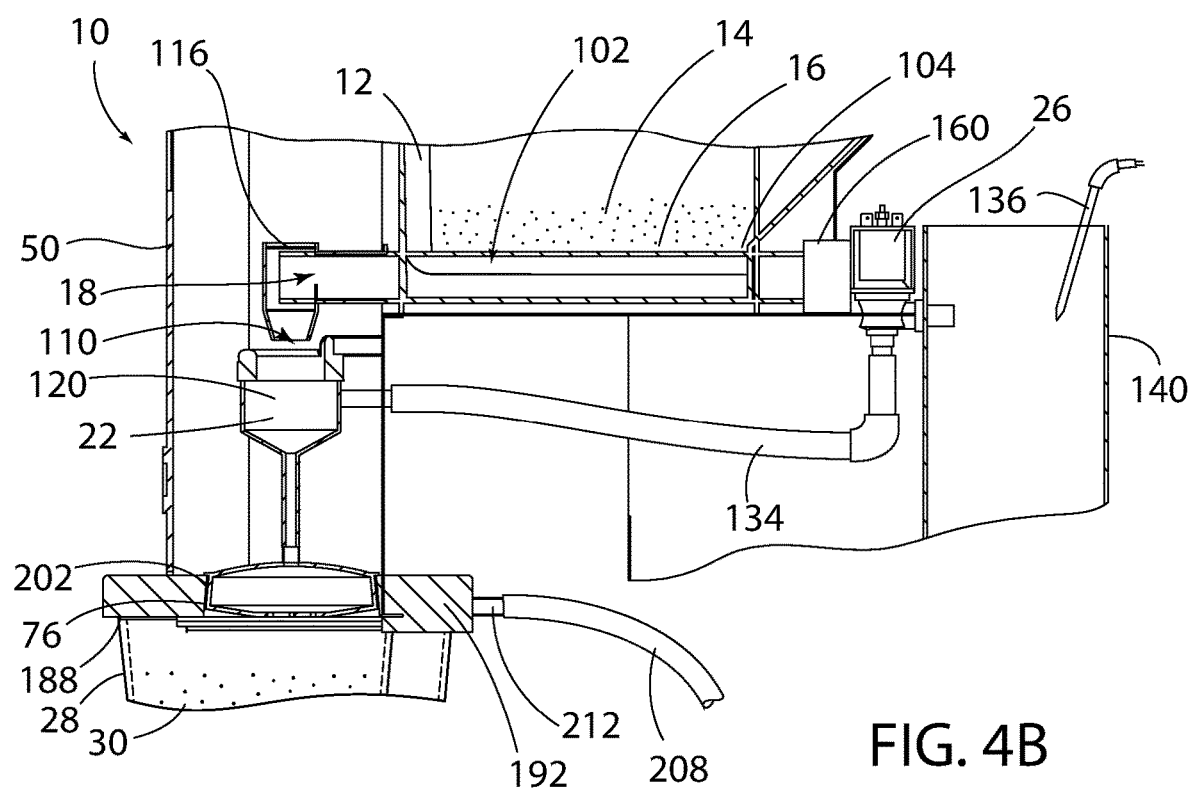
FIG. 4B is an enlarged view of the beverage brewing assembly of FIG. 4A.
Figure 4C:
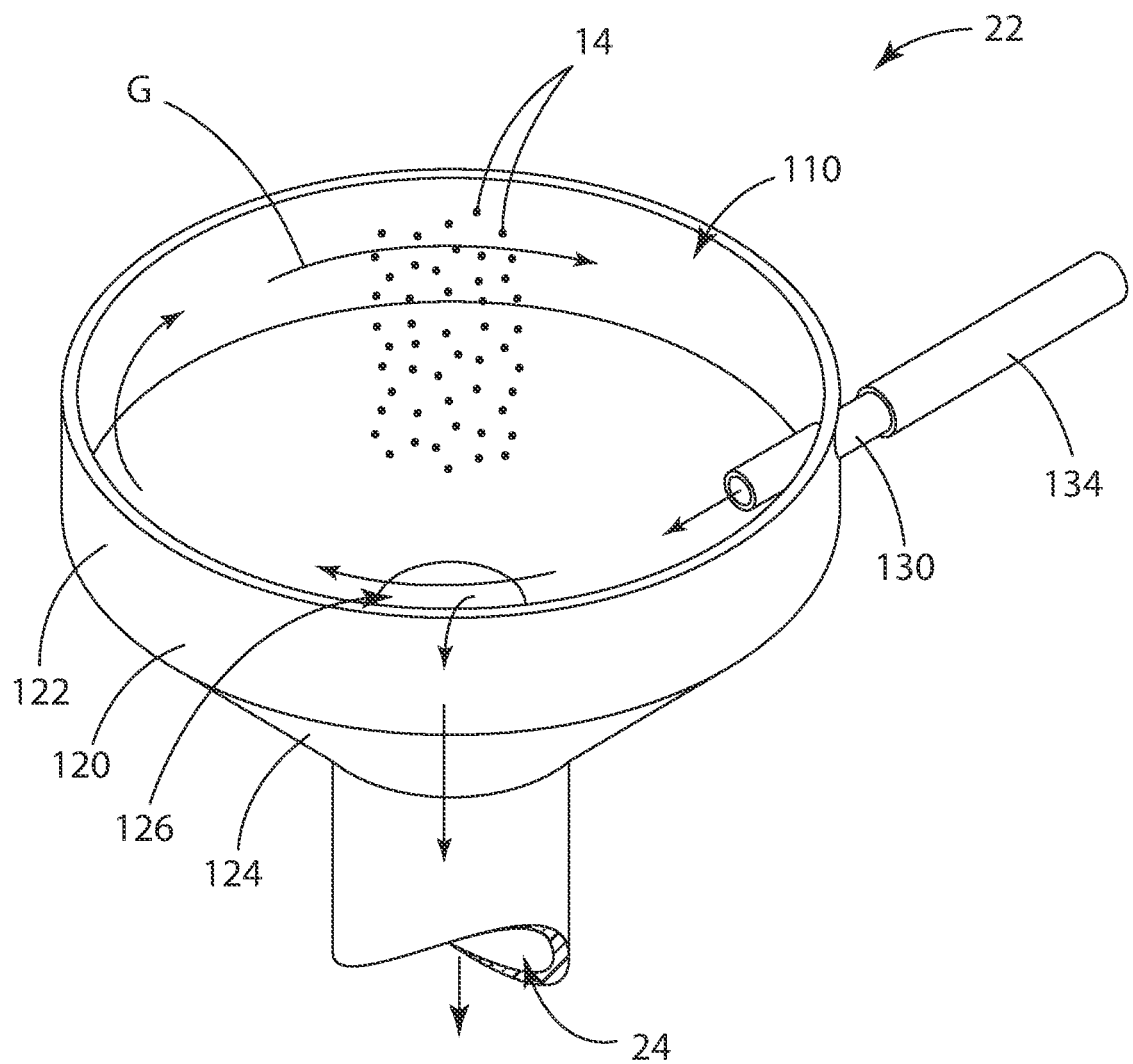
FIG. 4C is an enlarged side perspective view of a mixing chamber of the beverage brewing assembly of FIG. 4A.

Referring now to FIGS. 3A-4C, the beverage brewing assembly 10 of the beverage appliance 50 is illustrated according to various examples with a plurality of transporting and/or mixing components. Where the features remain the same, the same or similar numbers are used throughout. FIGS. 3A-3C illustrate the beverage brewing assembly 10 including an auger 20 coupled with the connector 16 and a mixing arm 146 positioned within the mixing chamber 22. FIGS. 4A-4C illustrate the brewing assembly 10 including a mechanical pump 160 coupled with the connector 16. It will be understood that any of these components may be used in combination with any of the other components, including those exemplary combinations illustrated here, without departing from the scope of the present disclosure.

Referring now to FIGS. 3A and 3B, at least one product canister 12 is positioned within the interior cavity 96 of the appliance body 52 proximate the upper opening 94. In various examples, the product canister 12 may be coupled with the appliance body 52 to be selectively filled by a user through the upper opening 94 of the top wall 58 for single or multiple uses. In other examples, the product canister 12 may be removably installed for a single use or for multiple uses. The product canister 12 is configured to house the first beverage material 14 for addition to the mixing chamber 22 during use of the beverage brewing assembly 10. The first beverage material 14 may be a sweetener (e.g., granulated sugar, liquid sweetener, stevia, or other non-sugar sweeteners), a powdered beverage product in a blended or natural form (e.g., cocoa, hot chocolate powdered mix, lemonade powdered mix, or other powdered beverage mix), or a flavor additive for a beverage (e.g., peach flavor additive or lemon flavor additive).

As introduced above, the connector 16 is operably coupled with the product canister 12. The connector 16 is positioned below the product canister 12 and above the mixing chamber 22 such that the connector 16 extends between the product canister 12 and the mixing chamber 22 to transport the first beverage material 14 from the product canister 12 to the mixing chamber 22. The connector 16 is configured as an elongated member defining a channel 102 sized to transport the first beverage material 14. As illustrated, the connector 16 may be positioned generally parallel to the top wall 58 of the appliance body 52. A coupling end 104 of the connector 16 is selectively coupled with the product canister 12, and the open end 18 of the connector 16 is defined opposite the coupling end 104. The open end 18 of the connector 16 is positioned to align with a top receiving end 110 of the mixing chamber 22.

As illustrated in FIGS. 3A and 3B, in various examples, an auger member 20 may be positioned within the channel 102 of the connector 16 proximate the coupling end 104 of the connector 16. The auger member 20 may be sized to be received by the channel 102 and may have a generally cylindrical shape for rotation within the channel 102. The auger member 20 extends from an auger actuator 112 (e.g., a motor) positioned proximate the coupling end 104 of the connector 16. The auger member 20 is configured to be selectively actuated to transport the first beverage material 14 from the product canister 12 through the channel 102 of the connector 16 to the open end 18 of the connector 16. The auger member 20 may be any rotatable member such as, for example, an auger arm or a spring.

As discussed above, the mixing chamber 22 is positioned below the open end 18 of the connector 16 such that the open end 18 of the connector 16 is aligned with the top receiving end 110 of the mixing chamber 22. In various examples, a removable adapter 116 may be coupled with the open end 18 of the connector 16 to direct the first beverage material 14 through the top receiving end 110 of the mixing chamber 22. Alternatively, the open end 18 of the connector 16 may be shaped to align with the top receiving end 110 of the mixing chamber 22 (e.g., the open end 18 may have a lip, may be formed proximate an elbow of the connector 16, or may be integrally formed with the adapter 116) without departing from the scope of the present disclosure. It is also contemplated that the open end 18 of the connector 16 and/or the adapter 116 may be positioned above the top receiving end 110 of the mixing chamber 22, as illustrated, or that the open end 18 of the connector 16 and/or the adapter 116 may be positioned to extend at least partially through the top receiving end 110 of the mixing chamber 22.

Referring again to FIGS. 3A-3C, the mixing chamber 22 includes a receiving body 120 having an upper portion 122 integrally formed with a lower portion 124. The upper portion 122 defines the top receiving end 110 of the mixing chamber 22 and may be generally cylindrical. The lower portion 124 extends from the upper portion 122 at an incline and may be generally frustoconical to guide contents of the mixing chamber 22 to a bottom opening 126 of the receiving body 120. In some examples, the lower portion 124 may further include an extension 148 positioned below the bottom opening 126.

The upper portion 122 of the receiving body 120 defines a water inlet 130 operably coupled with a water source 26 and positioned off-center of the mixing chamber 22. The water source 26 may be positioned within the interior cavity 96 of the appliance body 52 and is configured to provide water at a predetermined temperature to the mixing chamber 22. For example, the water source 26 may be configured as a hot water source. In various examples, the water source 26 may be a valve operably coupled with a water tank 140. In other examples, the water source 26 may be a valve operably coupled with an external water source (not shown). The water source 26 provides water through the water tube 134 and into the mixing chamber 22 based on a predetermined timing sequence, as discussed in more detail elsewhere herein.

A water tube, or other conduit, 134 is positioned to couple with, and extend between, the water inlet 130 of the mixing chamber 22 and the water source 26 to transport the water from the water source 26 to the water inlet 130. The water tube 134 may be flexible or rigid and may be any form of tubing configured to transport water.

In various examples, the temperature of the water provided to the mixing chamber 22 is regulated by a temperature probe, or sensor, 136 positioned within the water tank 140. The temperature of the water may be adjusted using a heater 142 operably coupled with the water tank 140 (e.g., the water tank 140 may be configured as a hot water tank). The predetermined temperature of the water being added to the mixing chamber 22 from the water source 26 may be any temperature, or range of temperatures, between about 33 degrees Fahrenheit and about 211 degrees Fahrenheit. The predetermined temperature is selected based on the first and second beverage materials 14, 30 being used with the beverage brewing assembly 10 and is obtained using the heater 142 coupled with the water tank 140. The heater 142 is actuated to obtain the predetermined temperature prior to the water source 26 delivering the water from the water tank 140 to the mixing chamber 22. The heater 142 is configured to adjust the temperature of the water within the water tank 140 to achieve the predetermined temperature based on the temperature read by the temperature probe 136. The temperature probe 136 may be any kind of temperature probe 136 configured to measure and/or regulate the temperature of a fluid. It is further contemplated that the heater 142 may be turned off to allow the water tank 140 to function as a cold water tank.

As illustrated, the mixing chamber 22 may include the receiving body 120 that defines a first chamber 150 and a second chamber 152. The first chamber 150 is defined by the upper portion 122 of the receiving body 120 and is in communication with the bottom opening 126 of the receiving body 120. The second chamber 152 is defined by the extension 148 and is in communication with the first chamber 150 and the bottom opening 126. A mixing assembly is coupled with the mixing chamber 22 and includes a mixing actuator 144 positioned proximate the extension 148 and operably coupled with a mixing arm 146. The mixing arm 146 is positioned within the second chamber 152 and is configured to be rotated to mix the contents of the mixing chamber 22 and/or cause the contents of the mixing chamber 22 to otherwise interact. The mixing arm 146 may include a plurality of blades, as illustrated, or may be any other shape for mixing the contents of the mixing chamber 22.

The extension 148 further includes the aperture 24 of the mixing chamber 22. In various examples, the aperture 24 is configured to deposit the contents of the mixing chamber 22 into the brew basket 28. In other examples, it is contemplated that the contents of the mixing chamber 22 may be deposited into a carafe, canister, or any serving or transfer container of any size and/or shape Referring now to FIGS. 4A and 4B, at least one product canister 12 is positioned within the interior cavity 96 of the appliance body 52 proximate the upper opening 94, as previously described. The connector 16 is operably coupled with the at least one product canister 12 and is positioned below the product canister 12 and above the mixing chamber 22 such that the connector 16 extends between the product canister 12 and the mixing chamber 22 to transport the first beverage material 14 from the product canister 12 to the mixing chamber 22. The connector 16 is configured as an elongated member defining the channel 102 sized to transport the first beverage material 14. As illustrated, the connector 16 may be positioned generally parallel to the base top wall 58 of the appliance body 52. The coupling end 104 of the connector 16 is selectively coupled with the product canister 12, and the open end 18 of the connector 16 is defined opposite the coupling end 104. The open end 18 of the connector 16 is positioned to align with a top receiving end 110 of the mixing chamber 22.

As illustrated in FIGS. 4A and 4B, in various examples, a mechanical pump 160 is coupled with the connector 16 to transport the first beverage material 14 through the channel 102 of the connector 16. The mechanical pump 160 is coupled with the connector 16 proximate the coupling end 104 of the connector 16. The mechanical pump 160 may be any pump configured to transport the first beverage material 14 (e.g., a liquid sweetener) through the channel 102 and through the open end 18 of the connector 16. The mechanical pump 160 is configured to be selectively actuated to transport the first beverage material 14 from the product canister 12 through the channel 102 of the connector 16 to the open end 18 of the connector 16.

As discussed above, the mixing chamber 22 is positioned below the open end 18 of the connector 16 such that the open end 18 of the connector 16 is aligned with the top receiving end 110 of the mixing chamber 22. In various examples, the removable adapter 116 may be coupled with the open end 18 of the connector 16 to direct the first beverage material 14 through the top receiving end 110 of the mixing chamber 22. Alternatively, the open end 18 of the connector 16 may be shaped to align with the top receiving end 110 of the mixing chamber 22 (e.g., the open end 18 may be formed proximate an elbow of the connector 16 or may be integrally formed with the adapter 116) without departing from the scope of the present disclosure. It is also contemplated that the open end 18 of the connector 16 and/or the adapter 116 may be positioned above the top receiving end 110 of the mixing chamber 22, as illustrated, or that the open end 18 of the connector 16 and/or the adapter 116 may be positioned to extend at least partially through the top receiving end 110 of the mixing chamber 22.

Referring again to FIGS. 4A-4C, the mixing chamber 22 includes the receiving body 120 having the upper portion 122 that defines the top receiving end 110 of the mixing chamber 22. The lower portion 124 extends from the upper portion 122 at an incline and may be generally frustoconical to guide contents of the mixing chamber 22 to the bottom opening 126 of the receiving body 120. The lower portion 124 defines the aperture 24 configured to deposit the contents of the mixing chamber 22 into the brew basket 28, a carafe, canister, or any serving or transfer container of any size and/or shape. The upper portion 122 of the receiving body 120 defines the water inlet 130 operably coupled with the hot water source 26, as described above. The velocity of the water from the water inlet 130 entering the mixing chamber 22 is configured to provide agitation and mixing of the contents of the mixing chamber 22 and to direct the contents through the aperture 24, as discussed in more detail elsewhere herein.

Figure 5:
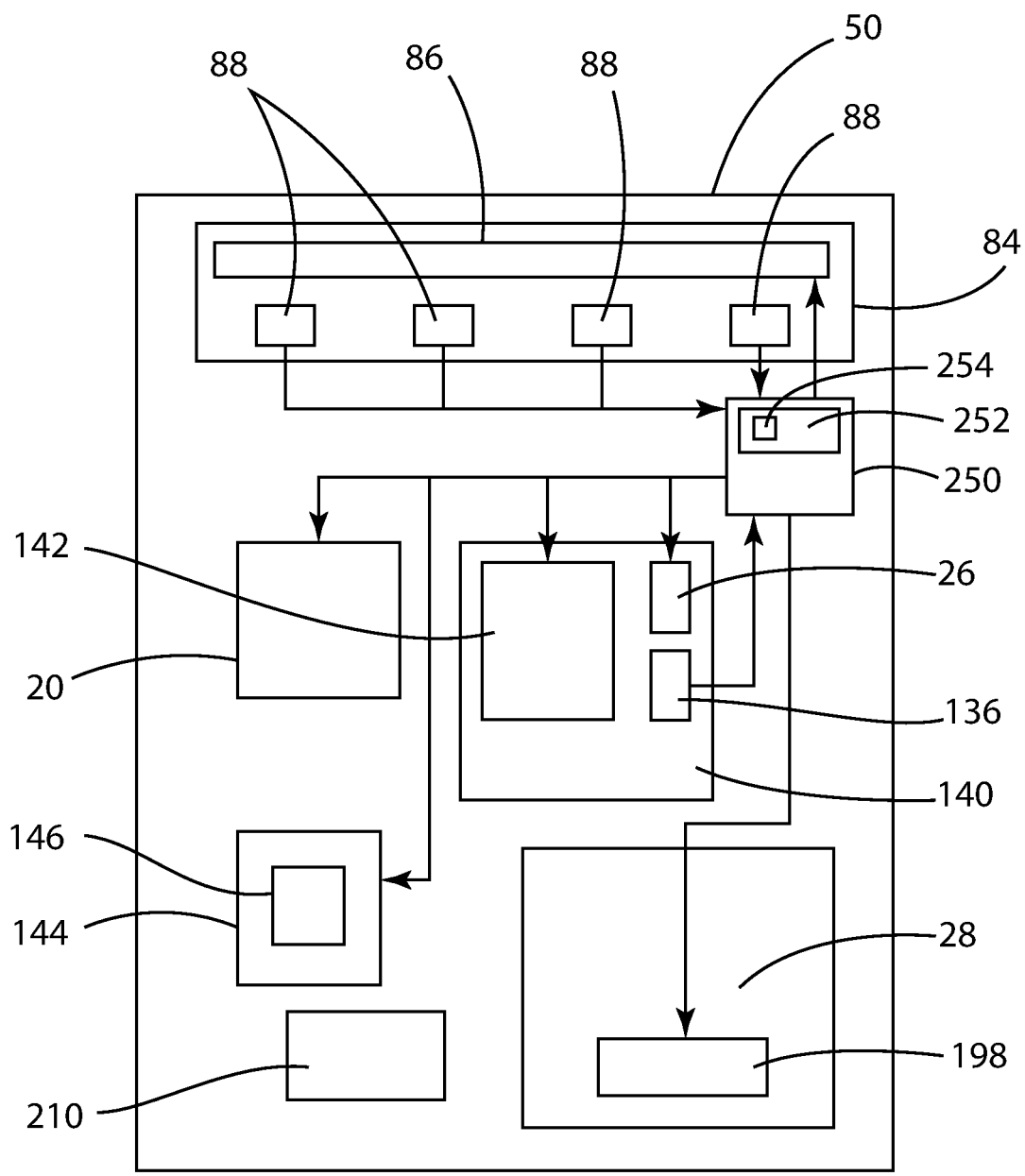
FIG. 5 is a schematic diagram of a control assembly for a beverage brewing assembly.

Referring now to FIG. 5, a schematic diagram illustrating the use of a controller 250 to receive input from the user interface 84. The controller 250 includes memory 252 having instructions 254 for operating the various portions of the beverage brewing assembly 10. For example, when a user selects a beverage, the controller 250 may receive input from the display 86 and/or the inputs 88 to determine the beverage being selected. The controller 250 may then provide instructions 254 to actuate the auger 20 to transport the first beverage material 14 to the mixing chamber 22. The controller 250 may also provide instructions 254 to actuate the water source 26 to provide water to the mixing chamber 22 for a predetermined time, as discussed in more detail below. The controller 250 may further provide instructions 254 to the heater 142 to heat the water within the tank 140 to a predetermined temperature, as detected by the temperature sensor 136. The controller 250 may also be configured to receive input from the temperature sensor 136 to adjust the actuation of the heater 142. The controller may further be configured to provide instructions 254 to the mixing actuator 144 to rotate the mixing arm 146 of the mixing chamber 22. The sealing member 198 of the brew basket 28 may also be configured to be actuated by the controller 250. It is also contemplated that a plurality of controllers 250 may be used wherein each controller 250 actuates one or more of the components of the beverage brewing assembly 10. The instructions 254 provided by the controller 250 may be based on steep time, steep temperature, etc. as programmed into the memory 252 of the controller 250 for each potential user input. For example, a tea beverage may require a longer steep time than a lemonade beverage, and the controller 250 may be configured to provide instructions 250 to adjust the position of the sealing member 198 accordingly.

Referring now to FIGS. 1-5, the brew basket 28 is slidably coupled with the intermediate wall 70 of the appliance body 52. The brew basket 28 includes an outer rim 188 configured to be at least partially received by the plurality of slots 78 of the intermediate wall 70 when the brew basket 28 is engaged with the intermediate wall 70. A handle 180 extends from the brew basket 28 and is configured to allow a user to move the brew basket 28 into and out of engagement with the plurality of slots 78 of the intermediate wall 70. When the brew basket 28 is engaged with the plurality of slots 78 of the intermediate wall 70, the brew basket 28 is positioned to extend into the receiving space 64 proximate a receptacle 34.

The brew basket 28 includes a basket body 184 that includes the outer rim 188 extending circumferentially about a top opening 186. The top opening 186 of the brew basket 28 is aligned with the lower opening 76 of the intermediate wall 70 and is positioned below the mixing chamber 22. In various examples, the brew basket 28 may be any shape including a sloped bottom wall 190 that surrounds an outlet 32 of the brew basket 28. The outlet 32 is positioned at a bottom of the brew basket 28 and is at least partially defined by the bottom wall 190 of the brew basket 28. The outlet 32 may be located along a centerline of the brew basket 28. The outlet 32 may include a sealing member 198 that is movable between a fully open position and a fully sealed position. For example, the sealing member 198 may be a slide gate or rotatory variable orifice restrictor. The sealing member 198 may be configured to meter the outlet 32 to allow full flow when the sealing member 198 is in the fully open position and the outlet 32 is unobstructed, no flow when the sealing member 198 is in the fully sealed position and the outlet 32 is fully obstructed, or a flow that is less than full flow when the sealing member 198 is positioned between the fully open position and the fully sealed position so that the outlet 32 is partially obstructed.

A second beverage material 30 is configured to be retained in the brew basket 28. The second beverage material 30 may be in any natural or processed form, including powdered form. For example, the second beverage material 30 may be tea leaves or coffee grinds. A filter 194 may be positioned within the brew basket 28. In various examples, the filter 194 may be disposable. In other examples, the filter 194 may be reusable and may be removable or integrally formed with the brew basket 28. It is contemplated that the second beverage material 30 may be positioned within a pre-packaged filter pouch configured to be placed in the brew basket 28 or in any other form that allows the second beverage material 30 be used to produce a brewed beverage (FIGS. 3A and 4A).

As illustrated in FIGS. 3A and 4A, in various examples, the brew basket 28 may further include an interior wall 196 configured to divide the brew basket 28 into a first chamber 204A and a second chamber 204B. The first chamber 204A is configured to receive the second beverage material 30 and is in communication with the outlet 32. When the interior wall 196 is positioned within the brew basket 28, the outlet 32 serves as the primary outlet for the brew basket 28. The second chamber 204B is defined rearward of the first chamber 204A. The second chamber 204B is configured to allow water to pass through the brew basket 28 without contacting the second beverage material 30. The water flows through the second chamber 204 and out of a secondary outlet 200 positioned proximate the outlet 32 of the brew basket 28. It is contemplated that the interior wall 196 may be removably coupled or fixedly coupled with the brew basket 28 without departing from the scope of the present disclosure.

In various examples, a dispenser head 202 may be positioned within the interior cavity 96 of the appliance body 52 proximate the brew basket 28. The dispenser head 202 is positioned above the bottom opening 126 of the intermediate wall 70 and is directly or operably coupled with the aperture 24 of the mixing chamber 22. The dispenser head 202 may be part of an adapter 192 for coupling the brew basket 28 with the rest of the beverage brewing assembly 10. The dispenser head 202 is configured to dispense the contents from the aperture 24 of the mixing chamber 22 into the brew basket 28. Where the interior wall 196 defines the first and second chambers 204A, 204B, the dispenser head 202 is configured to dispense the contents from the aperture 24 into the first chamber 204A. The dispenser head 202 may be configured to dispense contents into the brew basket 28 in a plurality of streams, in a single stream, in a spray, or in any other dispensing pattern. It is contemplated that the dispenser head 202 may be adjustable to allow for various dispensing patterns without departing from the scope of the present disclosure.

An ambient temperature water source 206 is positioned in the appliance body 52. The ambient temperature water source 206 is operably coupled with an ambient water tube 208 configured to couple the ambient temperature water source 206 with the brew basket 28 or the receptacle 34. The ambient temperature water source 206 may be a water inlet, as illustrated. The ambient temperature water source 206 is configured to provide water to the water tank 140 and to the adapter 192 for the brew basket 28. For example, the ambient water tube 208 may be split to direct water to one or both of the water tank 140 and a valve 210. The valve 210 may be positioned between the ambient water source 206 and the adapter 192 of the brew basket 28. The valve 210 is configured to selectively provide flow through the ambient water tube 208 and into the adapter 192. In various examples, the valve 210 may be configured as a solenoid valve or a needle valve. However, it is contemplated that any valve may be used.

As illustrated in FIGS. 1-4B, the receptacle 34 is positioned within the receiving space 64 and aligned using the guides 66. The receptacle 34 includes an inlet 212 configured to receive the brewed beverage from the beverage brewing assembly 10. The inlet 212 is aligned with the outlet 32 of the brew basket 28. The receptacle 34 may be any type of receptacle configured to receive a brewed beverage including a carafe, a beverage dispenser, a pitcher, a cup, a bowl, etc.

Figure 6A:
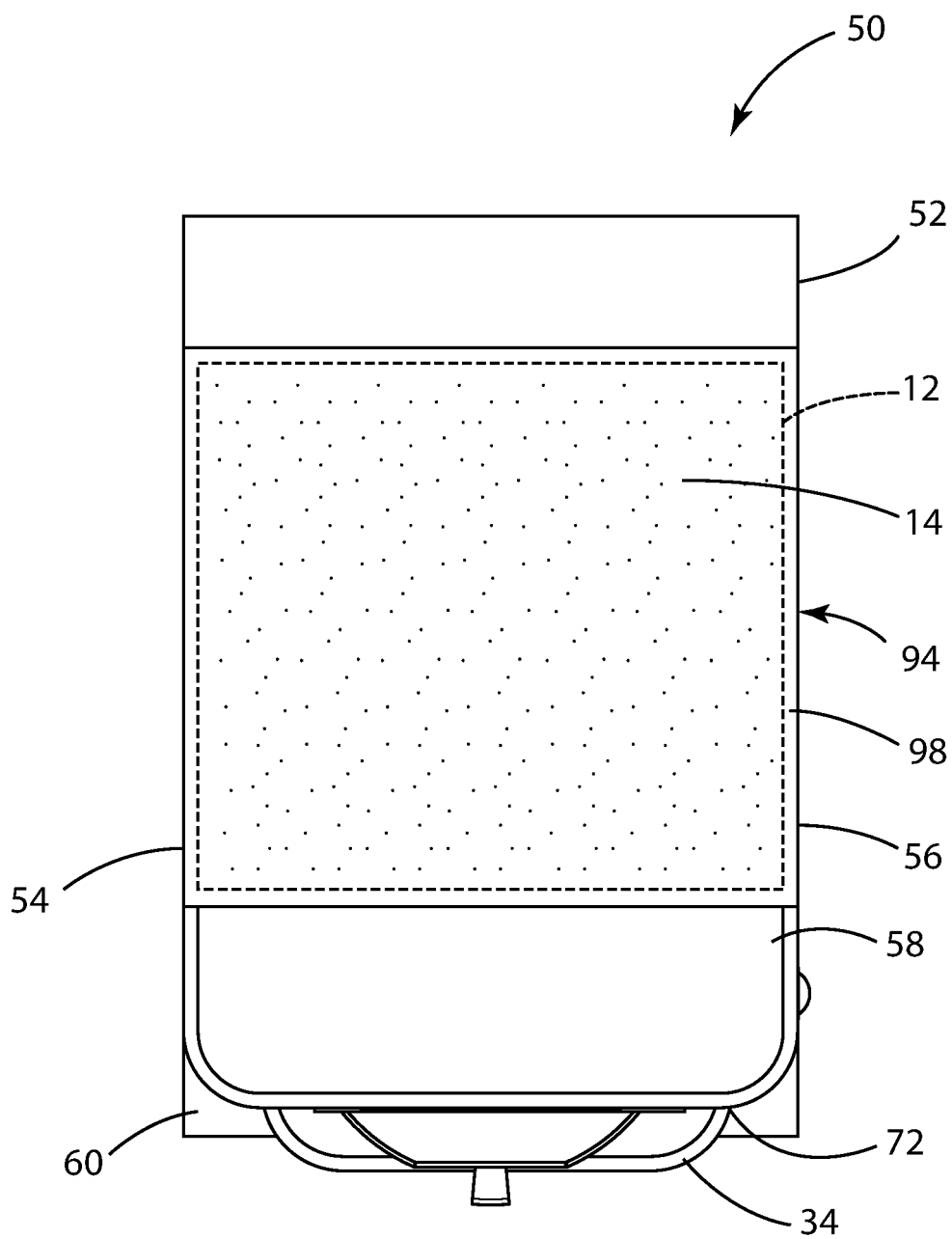
FIG. 6A is a top elevational view of a beverage appliance including a single product canister, according to various examples.
Figure 6B:
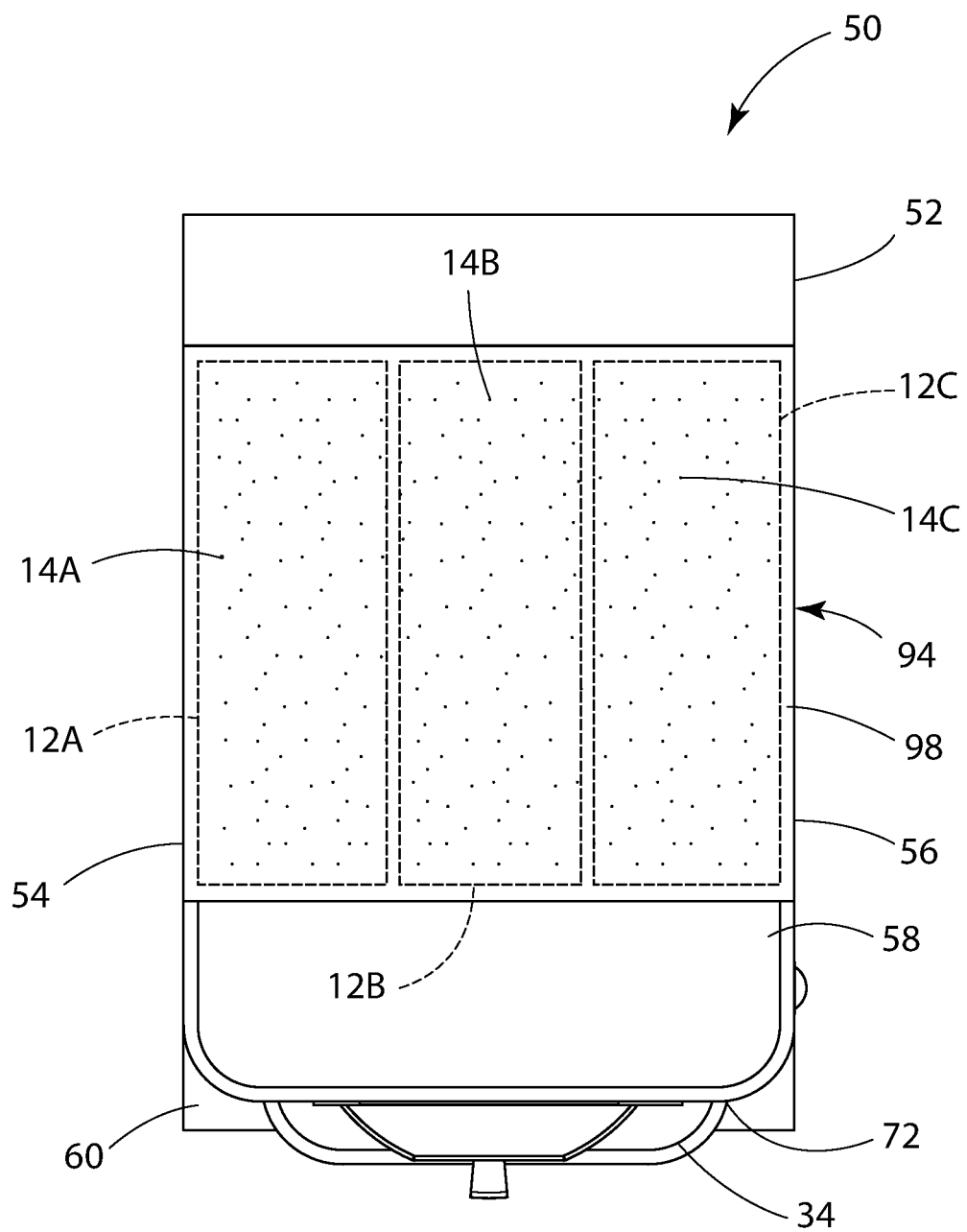
FIG. 6B is a top elevational view of a beverage appliance including a plurality of product canisters, according to various examples.
Figure 7:
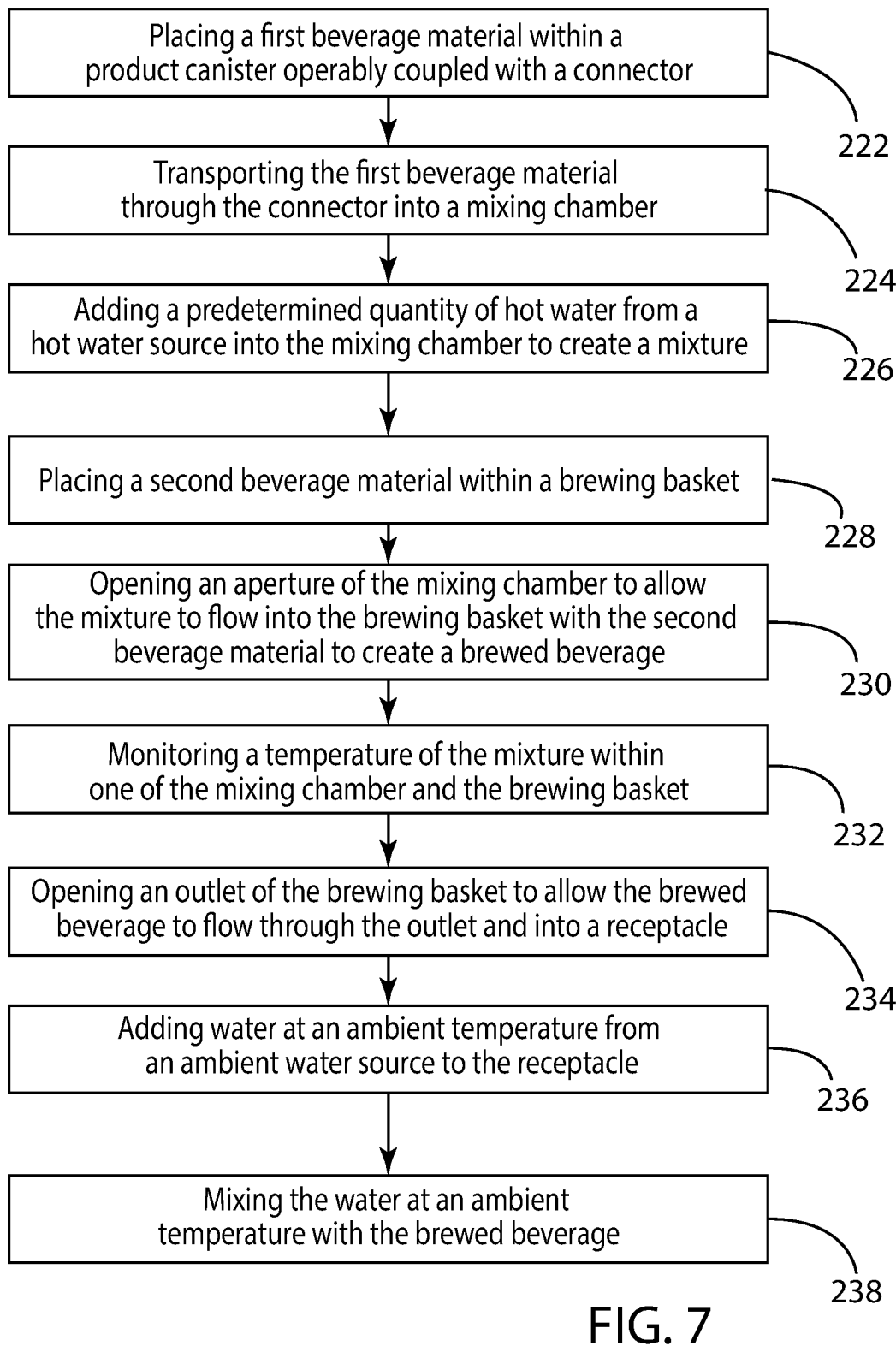
FIG. 7 is a flow diagram for a method of brewing a beverage.

Referring now to FIGS. 6A and 6B, it is contemplated that the beverage brewing assembly 10 may include a single product canister 12 (FIG. 6A) or a plurality of product canisters 12a, 12b, 12c (FIG. 6B). Each of the plurality of product canisters 12a, 12b, 12c may be configured to house a different type of first beverage material 14a, 14b, 14c. The types of first beverage materials 14a, 14b, 14c may be any kind of beverage material disclosed above, including, for example, sweeteners, powdered products, or flavor additives. Each of the plurality of product canisters 12a, 12b, 12c may be removably coupled with the appliance body 52 or may be fixedly coupled with the appliance body 52. The product canisters 12a, 12b, 12c may be single-use or may be configured for multiple uses. As illustrated, the plurality of product canisters 12a, 12b, 12c may be generally rectilinear. However, it is contemplated that the plurality of product canisters 12a, 12b, 12c may be any shape and positioned in any orientation, including a rotatable orientation, without departing from the scope of the present disclosure. It is further contemplated that the plurality of product canisters may include any number of product canisters and is not limited to three, as illustrated.

Referring now to FIGS. 1-6B, in use, the first beverage material 14 is positioned within the product canister 12. Alternatively, the product canister 12 containing the first beverage material 14 is positioned within the interior cavity 96 of the appliance body 52 of the beverage appliance 50. When a plurality of product canisters 12a, 12b, 12c are used, a selected canister of the plurality of product canisters 12a, 12b, 12c may be selected to be operably coupled with the connector 16. Additionally, the second beverage material 30 is positioned within the brew basket 28, and the brew basket 28 is coupled with the beverage appliance 50.

The first beverage material 14 is transported through the channel 102 of the connector 16 by one of the auger 20, the mechanical pump 160, or gravity. As illustrated in FIGS. 3A and 3B, where the auger 20 is used, the auger actuator 112 is actuated to rotate the auger 20 and transport the first beverage material 14 through the channel 102 and through the open end 18 of the connector 16. Where the mechanical pump 160 is used, the mechanical pump 160 is actuated to transport the first beverage material 14 through the channel 102 and through the open end 18 of the connector 16 (FIGS. 4A and 4B).

The first beverage material 14 is received from the open end 18 of the connector 16 by the top receiving end 110 of the mixing chamber 22. The water is further added to the mixing chamber 22 through the water inlet 130 and is configured to mix and/or interact with the first beverage material 14 to form a mixture. Where the mixing chamber 22 includes the mixing arm 146, the water from the water inlet 130 transports the first beverage material 14 along the path illustrated by arrow A and through the bottom opening 126 of the mixing chamber 22 along the path illustrated by arrow B. The mixture of the water and the first beverage material 14 is combined by rotation of the mixing arm 146 as illustrated by arrow C (FIGS. 3A-3C). For example, the first beverage material 14 may be added to the mixing chamber 22 for a first time interval (e.g., about 3.5 seconds) and the water from the water inlet 130 may be added for a second time interval (e.g., about 4.5 seconds). The mixing arm 146 may be actuated for the first time interval, the second time interval, or a third time interval to allow for mixing of the first beverage material 14 with the water to form the mixture. The third time interval may be the same as or different than the first and second time intervals. It is also contemplated that the first, second, and third time intervals may begin simultaneously or may begin in sequence without departing from the scope of the present disclosure. The water from the water inlet 130 and/or gravity may then guide the mixture along the path illustrated by arrow D and through the aperture 24.

In other examples, the velocity of the water entering the mixing chamber 22 through the water inlet 130 may be configured to agitate and mix the water and the first beverage material 14 so that the water and the first beverage material 14 interact to form the mixture (FIGS. 4A-5B). The predetermined quantity of water enters the mixing chamber 22 at an oblique angle relative to the center of the mixing chamber 22 and passes along the sides of the mixing chamber 22 as illustrated by arrow G. The velocity of the addition of the predetermined quantity of water into the mixing chamber 22 allows the predetermined quantity of water to combine with the first beverage material 14 within the mixing chamber 22 to form the mixture and then proceeds to transfer the mixture through the aperture 24 of the mixing chamber 22. For example, the first beverage material 14 may be added to the mixing chamber 22 for a first time interval (e.g., about 3.5 seconds) and the water from the water inlet 130 may be added to the mixing chamber 22 for a second time interval (e.g., about 4.5 seconds). The first and second time intervals may begin simultaneously so that the first beverage material 14 is mixed and transported by the addition of the water from the water inlet 130. Alternatively, the first and second time intervals may begin at different times to allow for a predetermined mixing time. The valve assembly 164 may then be opened to allow the mixture to flow through the aperture 24. Alternatively, the mixture may flow through the aperture 24 as the water is added without the obstruction of the valve assembly 164.

In various examples, the top opening 186 of the brew basket 28 is positioned to receive the mixture from the aperture 24 of the mixing chamber 22. In other examples, the top opening 186 of the brew basket 28 is aligned with the dispenser head 202 and the mixture flows from the aperture 24 through the dispenser head 202 and is dispensed into the brew basket 28. In various examples, the mixture is configured to bypass the second beverage material 30. In other examples, the sealing member 198 is configured to obstruct the outlet 32 of the brew basket 28 to prevent the mixture from flowing directly through the brew basket 28. When the sealing member 198 obstructs the outlet 32, the mixture is used to saturate and/or steep the second beverage material 30 within the brew basket 28 to form a brewed beverage. The mixture and the second beverage material 30 are retained within the brew basket 28 at a predetermined temperature for a predetermined time. After the predetermined time, the mixture and the second beverage material 30 form a brewed beverage. In various examples, the brewed beverage may be a beverage concentrate. The sealing member 198 may be moved out of the fully sealed position to the fully open position or to any position between the fully sealed position and the fully open position. The brewed beverage may then flow through the outlet 32 of the brew basket 28 into the receptacle 34. The ambient water may then be added to the brew basket 28 directly or through the dispenser head 202 to combine with the brewed beverage to form a final beverage product, for example, in a ratio 3:1 ambient water to brewed beverage. Alternatively, the ambient water may be added directly to the receptacle 34 to mix with the brewed beverage to form the final beverage product.

Specifically, a method 220 of brewing a beverage using the beverage brewing assembly 10 disclosed includes a step 222 of placing the first beverage material 14 within the product canister 12 operably coupled with a connector 16. In some examples, the first beverage material 14 is added to the product canister 12 positioned within the interior cavity 96 of the appliance body 52 of the beverage appliance 50. In other examples, the product canister 12 may be manufactured to include the first beverage material 14 and may be positioned within the interior cavity 96 of the appliance body 52 to couple with the connector 16. Further, the product canister 12 may be one of a plurality of product canisters 12a, 12b, 12c without departing from the scope of the present disclosure.

The method 220 further includes a step 224 where the first beverage material 14 is transported through the connector 16 into a mixing chamber 22. As discussed above, the step 224 of transporting the first beverage material 14 may be performed for a first time interval. The first time interval may be programmed into the beverage brewing assembly 10 based on the first beverage material 14 or may be manually selected by a user using the user interface 84 of the beverage appliance 50. In various examples, the transportation of the first beverage material 14 is performed by actuating the auger 20 or the mechanical pump 160 to transport the first beverage material 14 through the connector 16. In other examples, the connector 16 may be configured to allow the first beverage material 14 to pass through the connector 16 using gravity.

Another step 226 of the method 220 includes adding a predetermined quantity of water from the hot water source 26 into the mixing chamber 22 to combine with the first beverage material 14 to form a mixture. The step 226 of adding the hot water may be performed for a second time interval. The second time interval may also be programmed into the beverage brewing assembly 10 based on the first beverage material 14 or may be manually selected by the user using the user interface 84. The first time interval is generally less than the second time interval to allow the added water to move the mixture through the aperture 24 of the mixing chamber 22.

A second beverage material 30 is positioned within a brew basket 28 in another step 228 of the method 220, and the brew basket 28 is operably coupled with the appliance body 52 of the beverage appliance 50. The second beverage material 30 may be positioned loosely within the brew basket 28 or may be inside of a pre-manufactured pouch positioned within the brew basket 28. The filter 194 may be used with the second beverage material 30 to prevent the second beverage material 30 from flowing through the outlet 32 of the brew basket 28.

In some examples, another step 230 of the method 220 may include selectively opening the aperture 24 of the mixing chamber 22 by the valve assembly 164 when the brew basket 28 is coupled with the appliance body 52. The positioning of the mixing chamber 22 and the brew basket 28 allows the mixture to flow through the aperture 24 of the mixing chamber 22 into the brew basket 28. The method 220 may further include a step 232 of monitoring a temperature of the mixture within one of the mixing chamber 22 and the brew basket 28. The temperature probe 136 of the mixing chamber 22 regulates the temperature of the mixture within the mixing chamber 22, and the temperature probe 214 of the brew basket 28 regulates the temperature of the contents of the brew basket 28. The mixture may be retained within the brew basket 28 to allow the mixture to saturate and/or steep with the second beverage material 30 within the brew basket 28. The retention of the mixture and the second beverage material 30 within the brew basket 28 creates a brewed beverage. The brewed beverage may be a beverage concentrate. When the brewed beverage has been formed from the mixture and the second beverage material 30, another step 234 of the method 220 includes opening the outlet 32 of the brew basket 28 to allow the brewed beverage to flow through the outlet 32 and into the receptacle 34.

In some examples, the method 220 may further include a step 236 of adding water at an ambient temperature from an ambient temperature water source 206 to the receptacle 34 or to the brew basket 28 so that the ambient water mixes with the brewed beverage and flows through the outlet 32 of the brew basket 28. A further step 238 of mixing the water at an ambient temperature with the brewed beverage may also be performed in the method 220.

The use of the beverage brewing assembly 10 as disclosed herein allows a user to select various properties of a brewed beverage and utilize the beverage brewing assembly 10 to produce the selected brewed beverage. The beverage brewing assembly 10 also allows the sweetener or beverage product (i.e., the first beverage material 14) to be mixed with water to form a slurry or mixture before brewing the beverage using the second beverage material 30. This prevents uneven distribution of the sweetener or beverage product through the beverage that can be caused by adding the first beverage material 14 to the receptacle 34 after the beverage is brewed and is at a lower temperature. This also prevents the beverage from having a texture or cloudiness caused by the settling of undissolved pieces of the first beverage material 14 at the bottom of the receptacle 34.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A beverage brewing assembly comprising:
   a product canister configured to house a first beverage material;
   a connector operably coupled with the product canister and having an open end;
   an auger configured to transport the first beverage material through the connector;
   a mixing chamber positioned below the open end of the connector and configured to receive the first beverage material from the open end of the connector, wherein the mixing chamber comprises an aperture at a bottom of the mixing chamber;
   a hot water source operably coupled with the mixing chamber and configured to selectively provide a predetermined quantity of hot water to the mixing chamber to form a mixture that then passes through the aperture;
   a brew basket positioned below the mixing chamber, and configured to house a second brewing material and receive the mixture, wherein the brew basket comprises a top opening adapted for selective attachment to the assembly and an outlet at a bottom of the brew basket through which passes the mixture; and
   a receptacle positioned below the brew basket and configured to receive a brewed beverage formed from the mixture and the second brewing material from the outlet of the brew basket.

2. The beverage brewing assembly of claim 1, wherein the mixing chamber includes a mixing assembly positioned between the aperture and the brew basket.

3. The beverage brewing assembly of claim 1, wherein the brewed beverage is a beverage concentrate.

4. The beverage brewing assembly of claim 1, further comprising:
   an ambient temperature water source operably coupled with one of the brew basket and the receptacle.

5. The beverage brewing assembly of claim 1, wherein the outlet of the brew basket includes a sealing member configured to be selectively positioned at or between a fully open position and fully sealed position.

6. The beverage brewing assembly of claim 1, wherein the connector is disposed below the product canister and above the mixing chamber.

7. The beverage brewing assembly of claim 1, wherein the hot water source comprises an off-center inlet into the mixing chamber, whereby the predetermined quantity of hot water enters the mixing chamber at an oblique angle relative to the center of the mixing chamber.

8. The beverage brewing assembly of claim 1, wherein the product canister is one of a plurality of product canisters.

9. A beverage brewing assembly comprising:
   a mixing chamber configured to receive a first beverage material and defining an aperture configured to be selectively opened;
   a hot water source operably coupled with the mixing chamber and configured to selectively provide a predetermined quantity of hot water to the mixing chamber and thereby form a mixture comprising the first beverage material and the predetermined quantity of hot water;
   a brew basket positioned below the mixing chamber, and including a top opening adapted for selective attachment to the assembly and an outlet at a bottom of the brew basket, wherein the brew basket is configured to house a second brewing material and is configured to receive the mixture from the aperture of the mixing chamber to interact with the second brewing material; and
   a receptacle positioned below the brew basket and configured to receive a brewed beverage from the outlet of the brew basket.

10. The beverage brewing assembly of claim 9, wherein the mixing chamber includes a mixing assembly positioned between the mixing chamber and the brew basket.

11. The beverage brewing assembly of claim 9, wherein the hot water source deposits the predetermined quantity of hot water into the mixing chamber to combine with the first beverage material to form the mixture and to transfer the mixture through the aperture of the mixing chamber.

12. The beverage brewing assembly of claim 9, wherein the brewed beverage is retained within the brew basket at a predetermined temperature for a predetermined time.

13. The beverage brewing assembly of claim 9, further comprising:
   an ambient temperature water source coupled with one of the brew basket and the receptacle.

14. The beverage brewing assembly of claim 9, wherein the first beverage material is a sweetener.

15. The beverage brewing assembly of claim 14, wherein the sweetener is granulated sugar.

16. The beverage brewing assembly of claim 9, wherein the first beverage material is a powdered beverage product.

17. The beverage brewing assembly of claim 9, wherein the first beverage material is a flavor additive.

18. The beverage brewing assembly of claim 9, wherein the brewed beverage is a beverage concentrate.

19. A beverage brewing assembly comprising:
- a mixing chamber configured to receive a first beverage material and defining an aperture configured to be selectively opened;
- a hot water source operably coupled with the mixing chamber and configured to selectively provide a predetermined quantity of hot water to the mixing chamber and thereby form a mixture comprising the first beverage material and the predetermined quantity of hot water;
- a brew basket adapted for selective attachment to the assembly positioned below the mixing chamber, and including a top opening and an outlet at a bottom of the brew basket, wherein the brew basket is configured to house a second brewing material and is configured to receive the mixture from the aperture of the mixing chamber to interact with the second brewing material;
- a receptacle positioned below the brew basket and configured to receive a brewed beverage from the outlet of the brew basket; and
- an inner wall coupled with the brew basket and configured to separate the second beverage material from a flow of ambient water through a chamber of the brew basket.

20. A method of brewing a beverage comprising steps of:
- placing a first beverage material within a product canister operably coupled with a connector;
- transporting the first beverage material through the connector into a mixing chamber;
- adding a predetermined quantity of hot water from a hot water source into the mixing chamber to create a mixture within the mixing chamber;
- placing a second beverage material within a brew basket having a top opening adapted for selective attachment to the assembly and disposed below the mixing chamber; and
- opening an aperture of the mixing chamber to allow the mixture to flow into the brew basket with the second beverage material to create a brewed beverage.

21. The method of claim 20, further comprising a step of:
- actuating an auger to transport the first beverage material through the connector.

22. The method of claim 20, wherein the step of transporting the first beverage material through the connector is performed for a first time interval and adding the predetermined quantity of hot water from the hot water source into the mixing chamber to create the mixture within the mixing chamber is performed for a second time interval, and further wherein the first time interval is less than the second time interval.

23. The method of claim 20, further comprising a step of:
- opening an outlet of the brew basket to allow the brewed beverage to flow through the outlet and into a receptacle.

24. The method of claim 20, further comprising steps of:
- adding water at an ambient temperature from an ambient temperature water source to one of the brew basket and a receptacle; and
- mixing the water at an ambient temperature with the brewed beverage.

* * * * *